US009927293B2

(12) United States Patent
Sticherling

(10) Patent No.: US 9,927,293 B2
(45) Date of Patent: Mar. 27, 2018

(54) SENSOR ARRAY FOR DETECTING CONTROL GESTURES ON VEHICLES

(71) Applicant: HUF HÜLSBECK & FÜRST GMBH & CO. KG, Velbert (DE)

(72) Inventor: Nadine Sticherling, Velbert (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 0 days.

(21) Appl. No.: 14/911,416

(22) PCT Filed: Aug. 5, 2014

(86) PCT No.: PCT/EP2014/066843
§ 371 (c)(1),
(2) Date: Feb. 10, 2016

(87) PCT Pub. No.: WO2015/022240
PCT Pub. Date: Feb. 19, 2015

(65) Prior Publication Data
US 2016/0195430 A1    Jul. 7, 2016

(30) Foreign Application Priority Data
Aug. 14, 2013  (DE) .................. 10 2013 108 824

(51) Int. Cl.
G01J 1/44     (2006.01)
B60R 25/20    (2013.01)
(Continued)

(52) U.S. Cl.
CPC ............ *G01J 1/44* (2013.01); *B60R 25/2045* (2013.01); *B60R 25/2054* (2013.01);
(Continued)

(58) Field of Classification Search
CPC .......... G01J 1/44; G01J 1/0204; G01J 1/0411; G01J 1/0437; G01J 1/4228; B60R 25/2045; B60R 25/33
See application file for complete search history.

(56) References Cited

U.S. PATENT DOCUMENTS 6,323,942 B1 * 11/2001 Bamji ................. G01C 3/08
                                                   348/E3.018
2008/0074894 A1 * 3/2008 Decoster ............ G06K 9/00362
                                                   362/488
(Continued)

FOREIGN PATENT DOCUMENTS

DE    10 2008 025 669 A1    12/2008
DE    10 2011 089 195 A1     1/2013
(Continued)

OTHER PUBLICATIONS

International Preliminary Report on Patentability of International Application No. PCT/EP2014/066843 dated Feb. 16, 2016 and English Translation thereof, 12 pages.
(Continued)

Primary Examiner — Christine Sung
(74) Attorney, Agent, or Firm — Fay Sharpe LLP

(57) ABSTRACT

A sensor device for a motor vehicle includes a light source, a detection device and a control and evaluation device. The control and evaluation device activates the light source to emit pulses, activates the detection device for detecting light reflected back by the environment, and evaluates the signals from the detection device. The control and evaluation device, the detection device and the light source are designed as a Time-of-Flight structure for detection in a first spatial direction such that spatially assignable distance data are detected. The light source and the detection device are disposed in a receiving space arranged along a bearing surface of a vehicle. The light source is disposed inside the
(Continued)

receiving space in a tilted manner such than an angle of at least 5 degrees is formed between a normal to the bearing surface and an optical axis of the light source.

12 Claims, 3 Drawing Sheets

(51) Int. Cl.
| | | |
|---|---|---|
| *E05F 15/74* | (2015.01) | |
| *B60R 25/31* | (2013.01) | |
| *G01J 1/02* | (2006.01) | |
| *G01J 1/04* | (2006.01) | |
| *G01J 1/42* | (2006.01) | |
| *E05F 15/73* | (2015.01) | |

(52) U.S. Cl.
CPC .............. *B60R 25/31* (2013.01); *E05F 15/74* (2015.01); *G01J 1/0204* (2013.01); *G01J 1/0411* (2013.01); *G01J 1/0437* (2013.01); *G01J 1/4228* (2013.01); *E05F 15/73* (2015.01); *E05F 2015/765* (2015.01); *E05Y 2400/852* (2013.01)

(56) References Cited

U.S. PATENT DOCUMENTS

| | | | | |
|---|---|---|---|---|
| 2011/0295469 | A1* | 12/2011 | Rafii ................. | E05F 15/43 701/49 |
| 2014/0061447 | A1* | 3/2014 | Campbell ............ | G01S 7/4813 250/221 |
| 2014/0195096 | A1* | 7/2014 | Schliep ................ | G06F 3/011 701/29.1 |
| 2015/0185325 | A1* | 7/2015 | Park .................... | G01S 17/88 356/5.01 |
| 2015/0346343 | A1* | 12/2015 | Cho .................... | G01C 3/08 356/3.09 |
| 2015/0367816 | A1* | 12/2015 | Schindler ............. | G01S 17/89 356/5.01 |
| 2017/0045949 | A1* | 2/2017 | Schlittenbauer ....... | B60K 37/06 |

FOREIGN PATENT DOCUMENTS

| | | |
|---|---|---|
| WO | WO 2008/116699 A2 | 10/2008 |
| WO | WO 2012/084222 A1 | 6/2012 |
| WO | WO 2013/001084 A1 | 1/2013 |

OTHER PUBLICATIONS

Spickermann, Andreas, "Photodetectors and Readout Concepts for 3D Time-of-Flight Image Sensors in 0.35 μm Standard CMOS Technology", Department of Engineering Sciences, University of Duisburg-Essen, 2010, 224 pages (Abstract translation included).

König, Bernard, "Optimized Distance Measurement with 3D-CMOS Image Sensor and Real-Time Processing of the 3D Data for Applications in Automotive and Safety Engineering", Department of Engineering Sciences, University of Duisburg-Essen, 2008, 156 pages. (English Text).

International Search Report of International Application No. PCT/EP2014/066843 dated Nov. 13, 2014, 5 pages.

* cited by examiner

SENSOR ARRAY FOR DETECTING CONTROL GESTURES ON VEHICLES

BACKGROUND

The invention relates to sensor arrays, which are used on motor vehicles for optically supported detection of operating gestures or operating actions.

In particular, the invention relates to sensor arrays, which can detect and evaluate temporally and spatially resolved optical data, in order to identify the operating intentions of a user.

Optical methods are known in the prior art that detect actuations in reaction to an evaluation of image data, and subsequently trigger switching operations, for example. By way of example, automatic video evaluations of monitoring systems are to be specified here, which identify patterns or movements from individual images or a series of images. Furthermore, numerous other optically supported systems are known, wherein the most fundamental of them comprise electric eyes or brightness sensors. Optical systems with greater complexity frequently make use of a grid or array of optically sensitive detection units, usually referred to as pixels, which record parallel optical data, designed as CMOS arrays, for example.

DE 10 2008 025 669 A1 discloses an optical sensor, which detects a gesture, upon which a closing element of a vehicle is automatically moved.

WO 2008/116699 A2 relates to an optical sensor chip and concerns an optical clamping protection device for monitoring a window, sliding door or a hatch in a motor vehicle.

WO 2012/084222 A1 discloses an optical sensor for actuating and the monitoring of a closing element.

Because gesture control is experiencing increasingly greater acceptance in many technical fields pertaining to user interaction, it has also been attempted to use such purely optical systems for the detection of user intentions in motor vehicles. With these systems, the registration of operations via capacitive systems still predominates, however.

DE 10 2011 089 195 A1 discloses a system for the contact-less detection of objects and operating gestures with an optically supported device of a type that is similar to that which can also be used for the invention.

The known systems normally require more structural space than the capacitive systems in terms of the optical components and more complex electronics.

The object of the invention is to provide an improved, compact optical sensor system for the operating control of access systems for vehicles.

BRIEF SUMMARY

This object is achieved by a device having the features of claim 1.

The sensor device according to the invention is intended for a motor vehicle, wherein the sensor device can monitor and evaluate approaches and movements of a user, in particular in the exterior of the vehicle. The sensor device is provided, in particular, for the circuitry of access elements, e.g. door locks or rear locks, and is to be disposed accordingly in the side regions of the vehicle, e.g. in the A or B pillar, or in the rear region of the vehicle, in the bumper region, or in the region where the license plate lighting is located.

The invention relates to a sensor array thereby, which implements the time-of-flight method (TOF), for which reason this method shall be explained in brief below.

With TOF methods, a spatial region is illuminated with a light source, and the travel time for the light reflected back by an object in the spatial region is recorded with a line or area sensor. For this, the light sources and sensors should be disposed as closely together as possible, such that an angle between the light beam and the detection path can be basically disregarded. Light pulses are emitted from the light source, e.g. laser pulses of short duration (e.g. 30 ns to 300 ns), strike the object in the environment, are reflected, and pass through an optics element to the sensor. The sensor is likewise run in pulses, e.g. by means of an electronic closure (shutter). It is possible to determine the distance between the sensor and the measurement object from the linear relationship of light travel time and light speed.

In order to measure the temporal delay, the light source and sensor must be synchronized. Depending on the distance range that is to be detected, the relative temporal locations of the active pulse phases of the light source and photodetector array can be varied.

On one hand, the light source is operated in a pulsed manner with this concept. Furthermore, the detection unit, thus the photosensitive pixel array, is switched on and off in reaction to the pulses, thus the integration window of the individual pixels is temporally synchronized with light source, and limited in terms of the integration period. Free charge carriers are generated in the photodetector array by the arriving photons, collected, and in this manner, the voltage signal, corresponding proportionally to the integral, is generated via the arriving beam strength during the period when the shutter is open.

It is possible to take numerous measurements at different shutter speeds, in particular in order to take into account various reflection properties of detected objects. Furthermore, in order to suppress backlighting, a difference between measurements with the light pulse and without the light pulse can be calculated.

For the measurement principle, it is irrelevant whether the camera shutter is mounted in front of the image sensor or is accommodated behind the photodetector, in the form of a switch, for example, which interrupts the acquisition process of the photo-generated charge carriers. The fundamental idea for the measurement process is that only reflected light is registered within the short time in which the shutter is open.

Reference is made to documents pertaining to further technical concepts regarding the optical detection and spatial assignment of data for an explanation thereof, which describe these concepts in detail, in particular the dissertation, "Photodetectors and Readout Concepts for 3D Time-of-Flight Image Sensors in 0.35 µm Standard CMOS Technology," by Andreas Spickermann, Department of Engineering Sciences, University of Duisburg-Essen, 2010.

In addition, reference is made to the publication, "Optimized Distance Measurement with 3D-CMOS Image Sensor and Real-Time Processing of the 3D Data for Applications in Automotive and Safety Engineering," by Bernard König, Department of Engineering Sciences, University of Duisburg-Essen, 2008.

The important thing is that this detection method is not a purely image-based detection method. A distance datum is determined with each pixel, which occurs by means of the temporal light detection. With the use of a pixel array, a matrix of distance data is obtained, which allows for an interpretation and tracking of object movements with a cyclical recording thereof.

The sensor device according to the invention has, among other components, a light source and a detection device. The detection device has an array of optical pixels, thus photosensitive elements. In particular, the device can be a CCD element or suchlike. The array, together with the light source, forms the spatial data monitoring device of the type specified above, a "time-of-flight" system, also referred to as a "3D imager" or "range imager." A pixel array having a temporal activation is used thereby, which allows for distance detections, and can detect a movement of an object, in that the distance data is analyzed in a temporal sequence. Similar 3D sensors are already used in cars in lane-keeping assistant systems, for protecting pedestrians, or to aid in parking.

The light source is disposed close to the array of photosensitive pixels, at a short distance in the neighborhood of the array, for example. A control circuitry controls both the operation of the light source as well as the operation of the pixel array.

For the activation and synchronization of the light source and the detection device, both elements are coupled to the aforementioned control and evaluation device. This carries out the temporally coordinated illumination of the monitored space and the associated switching of the detection device into a detection mode. The light source is activated accordingly, to emit light pulses, and for this, emits light preferably in the long wave, non-visible spectrum, in particular the infrared spectrum. A laser diode or an extremely bright LED is provided for this.

The light source is equipped with an optics element, which distributes the emitted light in accordance with the application in the detection space. For this, an optics package, e.g. a lens package may be placed in front of the light source, which expands, or deflects, or focuses the emitted light beam.

In order to install it in vehicles, the sensor device, including the light source and the detection device, is integrated to form a unit, which can be easily installed in a vehicle. For this, the light source and detection device are disposed in a receiving space, which is provided and designed for attaching the sensor device to a vehicle. The receiving space can be an encompassing housing, or a shell, wherein at least one viewing window facing the detection region is formed for the detection device and the light source, respectively, which is optically transparent in the relevant wavelength range. The receiving space protects and retains the light source and the detection device, and orients them in the manner according to the invention.

The receiving space is thus designed to be attached to a vehicle, such that the receiving space is to be disposed along a bearing surface of the vehicle during the installation. The bearing surface is formed, for example, by the floor shape of a receiving space, e.g. a recess in the vehicle. The light source is disposed at a tilt inside the receiving space, according to the invention, such that an angle of at least 5° is formed between a normal to the bearing surface and the optical axis of the light source.

The light source is thus disposed at a tilt or an angle inside the receiving space, such that the optical axis of the light source and the associated optics element is at a slant in relation to the receiving space and the vehicle contour in the region of the installation. The term "tilting" or "slanting" indicates the deviating orientation of the light source with its optical axis from the primary installation plane inside the receiving space. For this, a first, primary installation plane is provided inside the receiving space, for electronic components, e.g. printed circuit boards, against which the light source is mounted with the specified tilt. If a sensor of this type is disposed, for example, in the B pillar of the vehicle, then this B pillar of a vehicle is frequently tilted in relation to the vertical, because the vehicle cross-section tapers toward the top. In order to enable an optimized detection of the environment of the vehicle, without increasing the structural space, a tilting or slanting of the lighting device itself occurs inside the receiving space, and also in relation to the outer shell of the vehicle. As a result, the tilted position of the assembly on the vehicle is compensated for or overcompensated for, in order to dispose the device in a narrower construction on the vehicle. The important thing is that the optical axis of the assembly, comprised of the light source and lens package, can be oriented at an angle to the receiving space.

While the light source is disposed according to the invention with its optical axis tilted in the receiving space, this does not need to apply for the optical axis of the detection device. It is, however, within the scope of the invention, entirely possible, in an advantageous manner, to also receive the optical axis of the detection device in the housing such that it is tilted, specifically such that it is tilted in the same direction as that of the light source, and with the same or a similar incline. In accordance with the invention, it is thus possible for there to be only a tilting of the lighting optics, or a tilting of the lighting optics as well as the detection optics. The term "tilting" is understood thereby to mean that a tilting in relation to the attachment surface, e.g. an attachment surface on the vehicle, is provide for, thus the respective optical axes assume an angle of at least 5° to the installation surface on the vehicle. Depending on the installation position on the vehicle, angles ranging from 5° to 45° may be considered; normally the angles are between 15° and 30°.

In a further development of the invention, the sensor array is disposed on a partially flexible printed circuit board, in particular a semi flex printed circuit board. Printed circuit boards that are designed such that they are flexible in sections and within defined bending gradients are referred to as semi flex printed circuit boards, wherein the cross-section of the printed circuit board is substantially reduced in the bending region. The sensor device is designed as an integral component of a printed circuit board assembly in this further development of the invention, wherein different sections of the printed circuit board are connected to one another by semi-flexible regions. The tilting of the optics element is designed such that it is tilted in relation to another part of the printed circuit board by the slanting angle, in that this optics element is disposed on the printed circuit board. By way of example, the control and evaluation circuit can be disposed on a first section of the printed circuit board, wherein a bending region of the printed circuit board extends along the printed circuit board such that it is offset in relation to this region, and adjoins this region, on which the light source is disposed with an optics package. The bending region between these printed circuit board regions is shaped such that the light source is tilted in relation to the first printed circuit board section. A second printed circuit board section can adjoin this in turn, which is then bent in the other direction, and thus in the direction of the first, not tilted printed circuit board section. The important thing is thus, that the tilting or slanting of the optics element, despite being installed on a uniform printed circuit board with flexible regions, is formed, and the tilting of the optics elements is obtained by a deformation of the printed circuit board in the flexible regions. In the same manner, by deforming the printed circuit board, a tilting of the detection axis of the detection device can also be obtained.

According to another aspect of the invention, the optical elements in the form of diffractive optical elements (DOE) are assigned to the lighting element. The aim of the sensor device according to the invention is to subject spatial regions that are delimited in a targeted manner to an optical control. Diffractive optical elements are elements for shaping a light beam, e.g. for beam splitting, beam expansion or for focusing. They make use of the physical principles of optical grids, in contrast to lens elements. By using these extremely small diffractive optical elements, the beam of a lighting device can be distributed and delimited over such spatial areas that are relevant for the detection.

Because the power of a lighting device in the sensor device is limited, the beam energy should be distributed to the relevant illumination regions as precisely as possible. For this purpose, according to a further aspect of the invention, it is provided that a diffractive optics element be assigned to the beam source, which performs a beam splitting. The beam splitting occurs such that divided light cones are emitted in different spatial regions from the same light source and the same sensor device. By way of example, with the installation of the sensor device in the B pillar of a vehicle, one lighting cone can be split off and focused along the shell of the vehicle toward the door handle of the drive door, while another light cone is guided away from the vehicle at a slight downward angle, in order to detect the approach of a user. By splitting the lighting intensity in this manner, on one hand an increased energy density can be obtained in the illuminated regions, in contrast to a broad emission in a larger region, and on the other hand, a selection of the relevant regions is achieved. The un-illuminated regions are then not detected by the receiving optics elements, or the detection device, respectively, and accordingly, are dimmed. The important thing is that a beam splitting is achieved by the elements, such that a uniform light source illuminates angular regions along a spatial angle in a discontinuous manner.

The diffractive optical elements may also be used for expanding the beam, in addition to the beam splitting.

According to another aspect of the invention, at least one of the lenses of the optics package of the lighting device is designed as a liquid lens. Liquid lenses of this type can be made very small, in particular. Liquid lenses can be adjusted, e.g., by means of electrical voltage, such that the beam angle of the lighting device can be adjusted according to the use, or the environmental conditions. The control and evaluation circuit can apply a voltage to the liquid lens, in order to modify its focal length and to illuminate different detection scenarios. By way of example, an intensive, focused illumination of a spatial angle can occur, or a broad illumination with lower energy density may be achieved. Fluid lenses can be used thereby in both the lighting optics as well as in the receiving optics.

BRIEF SUMMARY OF THE DRAWINGS

The invention shall now be described in greater detail based on the attached drawings.

DETAILED DESCRIPTION

Figure 1:
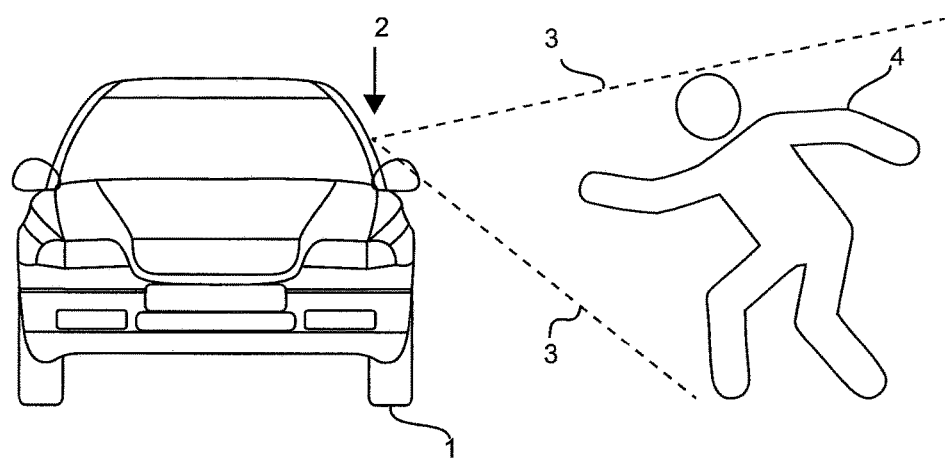
FIG. 1 shows, schematically, the application situation for a detection device in accordance with the patent, on a vehicle.

As is depicted in FIG. 1, a vehicle 1 is equipped with a sensor device 2 according to the invention. The sensor device 2 detects procedures and movements in a detection region 3, indicated here by broken lines. A user 4, who approaches the vehicle, has the possibility of executing movement gestures in the detection region 3, in order to access vehicle functions. In the embodiment shown here, the detection device 2 is accommodated on the side of the vehicle, in the B pillar. A detection device of this type can, however, also be disposed at other arbitrary locations on the vehicle, in particular in the rear region, or the front region. It is furthermore shown in FIG. 1 that the detection region 3 is oriented with its optical axis tilted in relation to the installation plane on the vehicle. While the B pillar tilts upward toward the vehicle center, the detection region is tilted slightly downward in relation to the horizontal plane. This is achieved by tilting the optics, as is explained below.

Figure 2:
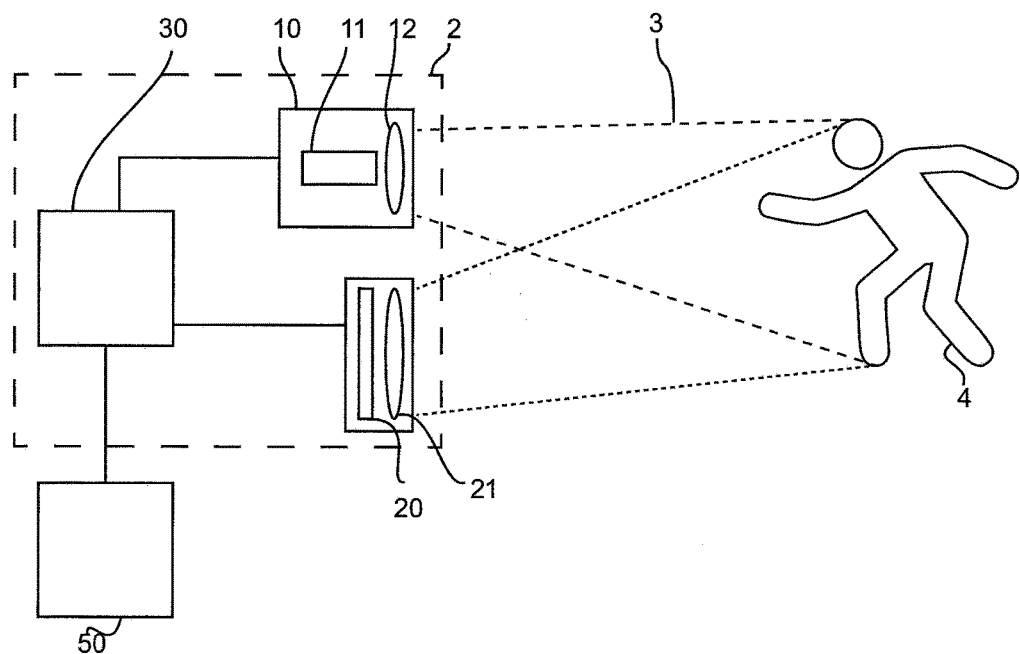
FIG. 2 shows the working components of a sensor array according to the invention, in a schematic depiction.

FIG. 2 shows the components of the detection device in a schematic depiction. The vehicle 1 is not shown in this depiction, for purposes of clarity.

The device is disposed in a receiving space 2, and has a light source 10, which is formed in this example by a laser diode 11 and an expanding optics element 12. The optics element 12 expands the beam cross-section, such that a broader detection region 3 is formed, into which a user 4 can enter, and in which he can execute movement gestures. This optics element can be a simple plastic optics element, or a glass optics element, e.g. a convex lens, an aspherical lens, or a Fresnel lens. Alternatively, diffractive optical elements can form the optics system or a portion thereof.

A detection array 20 is disposed adjacent to the light source, oriented with the sensitive region facing toward the detection region 3. The array 20 contains columns and lines of sensitive pixels, and is designed as a CCD array in this example. An optics element 21 is disposed upstream of the detection device 20, which maps the detection region 3 onto the CCD array. This optics element can also have a shutter or suitable filter that can be activated, in particular an infrared (IR) filter or polarizing filter, which suppresses backlighting in relation to the laser light. This optics element can also have fluid lenses, which allow for an activation and focusing, or it may even have a micro-lens array.

Both the light source 10 as well as the array 20 are coupled to a control device 30, which enables a clocked and time-controlled operation of the light source 10 and the detection device 20. If the light source 10 is activated for emitting a light pulse, and the pixel array assembly is activated for detection, then the individual pixels integrate the arriving light energy for a predefined time period. Each charge of each pixel that is present after the respective integration is evaluated in the control device, such that a characteristic detection value for the integration time period is generated for each pixel.

A detection of the light travel time, and thus the distance detection, is possible for each pixel of the detection device 20 via this time coordinated and synchronized activation of both the light source 20 as well as the detection device 20.

For an explanation of the exact function, reference is made to the publications specified above, in particular the time-of-flight devices.

In practice, the light data is not emitted solely by a user, from which the light emitted from the light source 20 is reflected back, but rather, an integration is carried out over the entirety of the light received from all visible points. The environment also contributes to the detection. Algorithms and operating methods for the sensor array are known, however, with which the ambient light can be substantially deducted. In particular, numerous recordings can be made in quick succession, and with modified temporal parameters, in order to cancel out the background light. A detection of this type can occur, in particular, with different integration times, in order to eliminate background effects. If, for example, the light pulse is emitted with identical durations, but the integration varies in terms of its duration, then the background effects have a linear relationship to the integration time, while the effects from the light pulse only exist for the duration of the light pulse.

The control and evaluation device 30 records the data and processes it in an array of distance data. As a result, a 3D map of the environment can be created. Through a temporal sequence of manual controls 3D data of spatial changes and object movements can be detected in the detection region 3. By way of example, the pivoting of a hand of the user 4 can be detected. The control device 30, and by means thereof, the entire detection device, are coupled to a central control device 50 of the motor vehicle. The identification of movement gestures can take place, on one hand, based on a catalogue in the control and evaluation device 30, or a temporal sequence of 3D spatial data is fed to the central control device 50, in order to be evaluated there. The device 30 can also have a pattern recognition, e.g. in the design of a neural network, in order to identify operating gestures based on characteristic spatial data. The central control device 50 lastly initiates the function triggering of the motor vehicle, based on the acquired data, e.g. the lowering of a side window, or the opening of a door or rear hatch.

Figure 3:
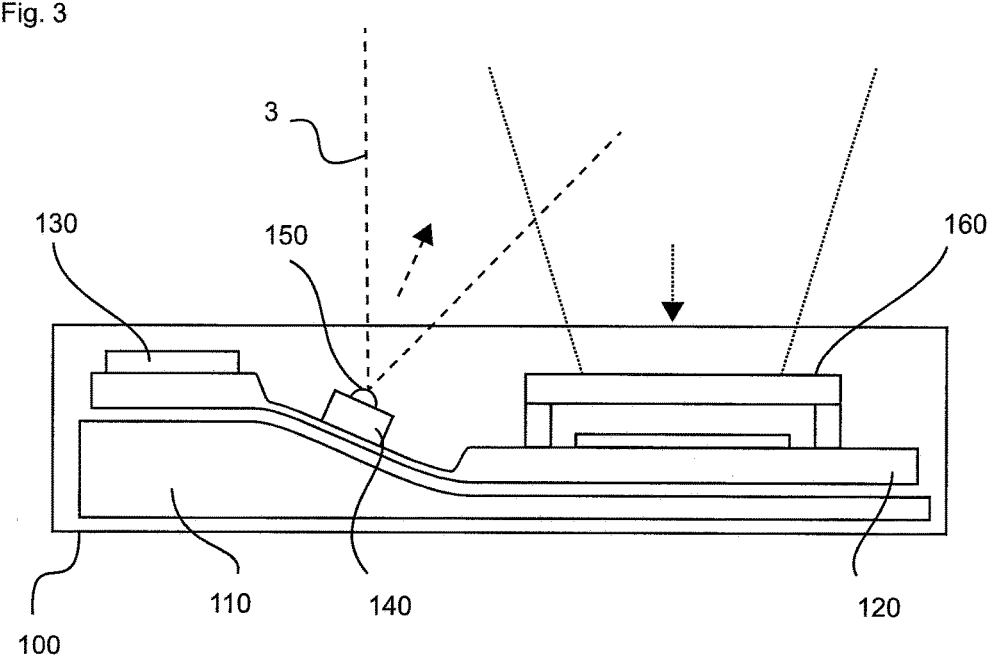
FIG. 3 shows the schematic construction, with a tilted lighting device according to another exemplary embodiment of the invention, in a schematic sectional view.

After the sensor array has been explained in terms of its schematic construction and the position thereof in the vehicle, FIG. 3 shows a first exemplary embodiment of the sensor construction in a lateral sectional view of the integrated sensor device. A housing 100 forms a receiving space for the sensor components. A mount 110 is formed in the housing 100, which forms the foundation for the circuit assembly that is to be placed thereon. The circuit assembly is disposed on a partially flexible printed circuit board 120. This has thin, flexible regions and thicker, rigid regions. The control and evaluation device 130 is placed in a first section of the printed circuit board 120. This may contain a microcontroller, memory elements and further electronic circuit elements. A tapered, more flexible region of the printed circuit board 120 adjoins the region that supports the control and evaluation device 130, followed by a printed circuit board section 140, which supports the lighting device 150. In continuing along the printed circuit board 120, there is another tapered, more flexible region of the printed circuit board, and a stiffer, thicker region of the printed circuit board 120, on which the optical detection device 160 is formed. The optical detection device has a CMOS array and an associated optics element in this example. The mount 110 is adapted to the printed circuit board and it flexible regions, such that the printed circuit board sections are supported at different angles. It is visible that the central rigid printed circuit board section is placed on a ramp in the mount 110 such that the lighting device 150 is tilted in relation to the other components, in particular in the other sections of the printed circuit board.

In this manner, a structurally compact optical sensor is created, which can be mounted, for example, on the B pillar of the vehicle with its rear flat surface (undersurface in FIG. 3), which can still emit light in a region that is tilted in relation to the installation surface. Because the printed circuit board is first populated in a flat position, thus with a planar orientation of the printed circuit board sections, and is first later placed in the receiving space and on the mount, the installation of the optics element 150 on the printed circuit board 150 can be implemented in a simple manner, corresponding to the typical installation of an optics element on a flat printed circuit board. The printed circuit board first obtains the tilting of the optical light source with is tapered regions by means of the receiving space and the mount in the receiving space.

It is also visible that the detection device 160 can also be tilted in accordance with the invention by means of the appropriate design of the mount 110. Furthermore, it is visible that for a tilting of the light source 150 in accordance with the invention, a semi flex printed circuit board is not necessarily required, and instead, numerous printed circuit boards can also be coupled by means of conductive connections.

By coordinating a mount with a tilt, and the subsequent attachment of the various components to the locations provided therefor on the mount in the receiving space, a sensor array having an advantageous alignment of the optical components is created. It is possible, for different vehicle models, which require different installation planes and tilts, to insert different mounts 110 in a receiving space 100, or to form different mounts 110 on different receiving spaces 100 with associated mounts. In this manner, the same printed circuit board assembly, having a light source, control and evaluation device, and optical detection device, can be used for different vehicle models.

Due to the concept of populating the printed circuit board in a single plane, as is shown in this construction, and the arrangement on corresponding receiving structures for a tilting or slanting of the optics element, it is possible to use commercial installation sets for optics elements and LEDs or laser diodes.

Figure 4A:
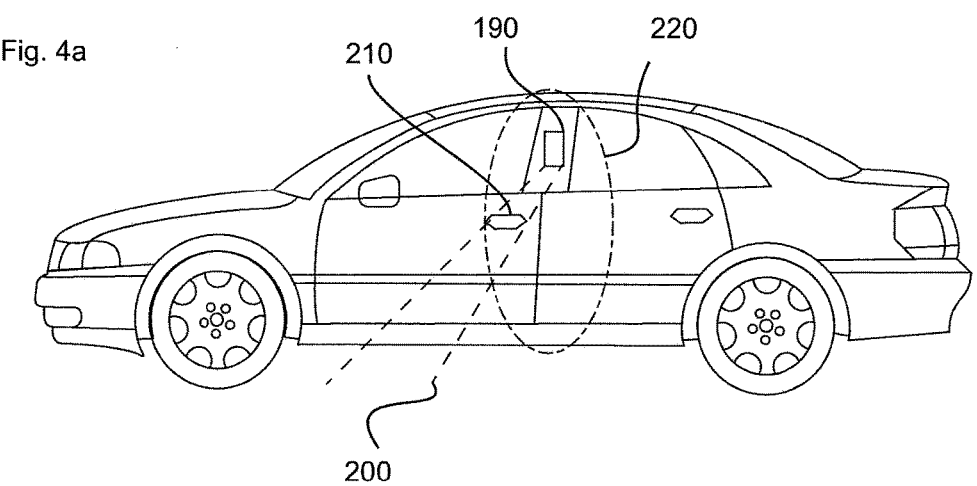
FIGS. 4a, 4b show the beam splitting of the lighting device according to another exemplary embodiment of the invention.
Figure 4B:
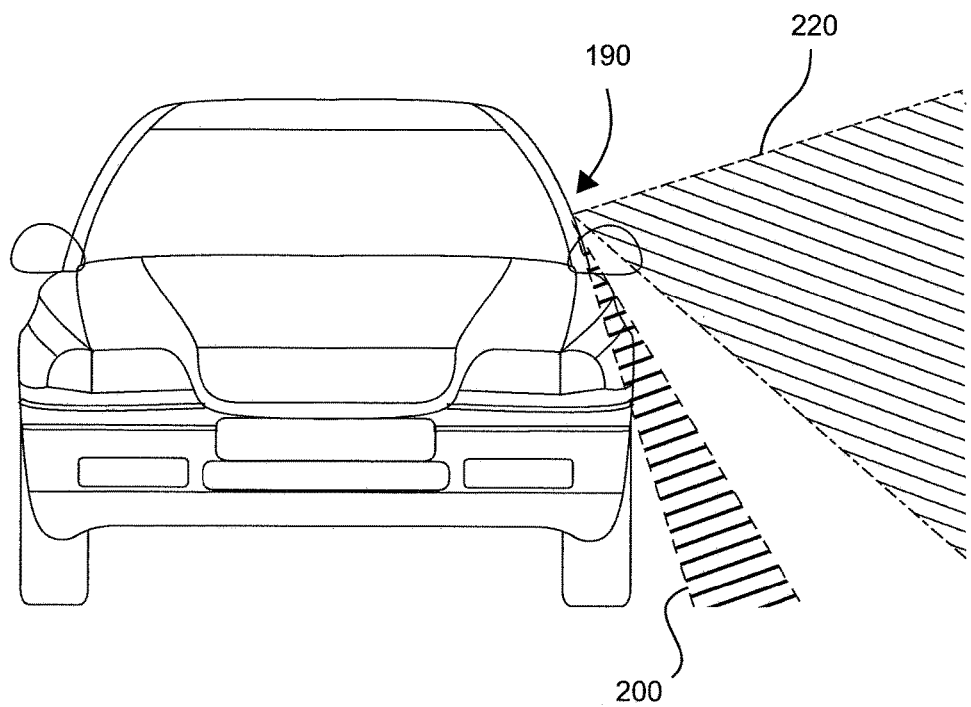

FIGS. 4a and 4b show another concept in accordance with another exemplary embodiment of the invention. According to this exemplary embodiment, the sensor device 190 is accommodated in the B pillar of the vehicle, and a beam splitter device is used as a part of the optics package for the lighting device. For this, structurally small, diffractive optical elements are used, in order to deflect the beam energy of the light source itself, e.g. the laser diode, into different spatial regions. FIG. 4a shows that a portion of the beam energy is split off in a downward direction and toward the front of the vehicle, and broadened into a beam cone 200, such that the door handle 210 of the driver door lies in the illumination region. Another portion 220 of the beam energy is deflected laterally away from the vehicle in a cone slanted downward, in order to illuminate users who approach the vehicle from that direction. In this manner, irrelevant or interfering detection signals can be prevented, because only sub-regions that are relevant for the detection are illuminated. If, for example, a user advances his hand toward the door handle, he moves the hand in the split-off beam cone that is directed toward the door handle, and thus causes a significant signal increase in the light reflected back to the detection device.

The beam splitting can occur in numerous beam components, that are deflected in different direction. The important thing is that a single light source is sufficient in this case, for illuminated different and separate regions, and furthermore, the reflected light is detected with just one uniform detection device.

The invention claimed is:

1. A time-of-flight sensor device for a motor vehicle comprising a light source and a detection device, wherein the detection device is formed with an array of optical pixels, wherein the light source and the detection device are coupled to a control and evaluation device, which activates the light source to emit light pulses and activates the detection device for detecting the light reflected back by the environment, as well as evaluating the detected signals of the detection device, wherein the control and evaluation device carries out a temporally coordinated illumination of a monitored space and an associated switching of the detection device into a detection mode for detection in a first spatial direction, wherein the array of optical pixels is switched on and off in reaction to the pulses such that an integration window of the individual pixels is temporally synchronized with the light source, such that spatially assignable distance data are detected, wherein the light source and the detection device are disposed in a receiving space, which is designed for the installation of the sensor device on a vehicle, wherein the receiving space is arranged along a bearing surface of the vehicle, wherein the light source is disposed inside the receiving space in a tilted manner, such that an angle of at least 5° is formed between a normal to the bearing surface and an optical axis of the light source.

2. The sensor device according to claim 1, wherein a supporting profile is disposed in the receiving space, which has at least one diagonal supporting section for the light source, and retains the light source in the tilted position.

3. The sensor device according to claim 1, wherein the light source and the detection device are placed on a partially flexible printed circuit board, wherein the section of the printed circuit board supporting the light source is fixed at the tilt angle in relation to another section of the printed circuit board.

4. The sensor device according to claim 3, wherein the detection device is likewise fixed in place on the tilted section of the printed circuit board supporting the light source.

5. The sensor device according to claim 1, wherein the light source has optical components for shaping a light beam, wherein at least one of the components is formed by a diffractive optics element.

6. The sensor device according to claim 1, wherein the light source has a beam splitter, which splits the emitted light into discontinuous spatial angular regions.

7. The sensor device according to claim 1, wherein the light source has at least one liquid lens as an optical component.

8. The sensor device according to claim 7, wherein the liquid lens is coupled to the control and evaluation device, in order to execute a beam shaping of the light source as a function of the activation thereof.

9. The sensor device according to claim 1, wherein at least one optical filter is disposed upstream of the detection device.

10. The sensor device according to claim 9, wherein the at least one optical filter is an infrared filter or a polarizing filter.

11. The sensor device according to claim 1, wherein the tilting angle is between 5° and 30°.

12. The sensor device according to claim 11 wherein the tilting angle is between 5° and 20°.

* * * * *